US011745932B2

(12) United States Patent
Logel et al.

(10) Patent No.: US 11,745,932 B2
(45) Date of Patent: Sep. 5, 2023

(54) CONTAINER FOR RECEIVING MOISTURE SENSITIVE GOODS

(71) Applicant: CLARIANT HEALTHCARE PACKAGING (FRANCE) S.A.S., Choisy le Roi (FR)

(72) Inventors: Valere Logel, Levallois Perret (FR); Franck Richir, Monthault (FR)

(73) Assignee: AIRNOV, INC., New Castle, DE (US)

( * ) Notice: Subject to any disclaimer, the term of this patent is extended or adjusted under 35 U.S.C. 154(b) by 382 days.

(21) Appl. No.: 16/285,579

(22) Filed: Feb. 26, 2019

(65) Prior Publication Data

US 2019/0241345 A1    Aug. 8, 2019

Related U.S. Application Data

(63) Continuation-in-part of application No. 13/727,994, filed on Dec. 27, 2012, now Pat. No. 10,246,241.

(30) Foreign Application Priority Data

Feb. 28, 2012    (EP) .................................... 12305235

(51) Int. Cl.
| | | |
|---|---|---|
| B65D 81/26 | (2006.01) | |
| B01D 53/26 | (2006.01) | |
| B65D 43/16 | (2006.01) | |

(52) U.S. Cl.
CPC ......... *B65D 81/266* (2013.01); *B01D 53/261* (2013.01); *B65D 43/164* (2013.01); *B65D 43/169* (2013.01); *B65D 2543/00092* (2013.01); *B65D 2543/00296* (2013.01); *B65D 2543/00518* (2013.01); *B65D 2543/00537* (2013.01); *B65D 2543/00842* (2013.01)

(58) Field of Classification Search
CPC .......... B65D 81/265–266; B65D 81/05; B65D 81/3806; B65D 81/3818; B65D 77/0426; B65D 2577/041; B65D 51/30; B65D 51/244; B65D 43/164; B65D 43/169; B65D 43/0254; B65D 41/485; B65D 81/264; A61J 1/03
USPC .......... 206/204; 220/23.89, 528, 23.87, 23.9, 220/592.27
See application file for complete search history.

(56) References Cited

U.S. PATENT DOCUMENTS

| | | | | |
|---|---|---|---|---|
| 2007/0056863 | A1* | 3/2007 | Chou .................... | B65D 81/262 206/204 |
| 2007/0193891 | A1* | 8/2007 | Portier .................... | B65D 79/02 206/204 |
| 2009/0194904 | A1* | 8/2009 | Logel .................... | B29C 45/006 264/250 |

(Continued)

*Primary Examiner* — Robert Poon
(74) *Attorney, Agent, or Firm* — Scott R. Cox

(57) ABSTRACT

A container for receiving moisture sensitive goods containing a container body and a cap. The container body has a base and a sidewall extending upwards from the base. An insert element inside the container body has a bottom and an insert sidewall, wherein the insert element is dimensioned to fit into the interior of the container body such that at least a portion of an outer circumferential surface of the insert sidewall is in abutting contact to the inner circumferential surface of the sidewall of the container body. The insert sidewall and the sidewall of the container body are designed to attach the insert element inside the container body.

14 Claims, 11 Drawing Sheets

(56) References Cited

U.S. PATENT DOCUMENTS

| | | | |
|---|---|---|---|
| 2010/0140116 A1* | 6/2010 | Stiene | B65D 81/266 206/204 |
| 2011/0056951 A1* | 3/2011 | Wooldridge | B65D 81/267 220/495.01 |
| 2016/0031627 A1* | 2/2016 | Yeh | B65D 81/266 206/204 |
| 2019/0039804 A1* | 2/2019 | Freedman | B65D 81/266 |

* cited by examiner

CONTAINER FOR RECEIVING MOISTURE SENSITIVE GOODS

CROSS REFERENCE TO RELATED APPLICATIONS

This application is a continuation-in-part application based on application Ser. No. 13/727,994, filed on Dec. 27, 2012 and claims priority to European Patent Application No. 12 305 235.9, filed 28 Feb. 2012. The entire contents of the above-applications are incorporated herein by reference.

FIELD OF THE INVENTION

The invention relates to a container for receiving moisture sensitive goods and a method of manufacturing such a container.

DESCRIPTION OF THE PRIOR ART

Many articles have to be stored and shipped in an environment which is as dry as possible. Therefore, containers are known having the ability to absorb excess moisture inside the container body. In such a way, moisture sensitive goods like medication will normally be protected from moisture until it reaches the end user. However, the consumer must repeatedly open and close the container to access the medication so that moisture loaded air can enter the container each time it will be opened by the user. For this reason it is known in the art to include a desiccating element together with the medication in the container.

A container is known from EP 0 454 967 A2 which comprises a container body with a container wall and a container bottom, and a layer arranged internally in the container. This layer comprises a desiccant so that the container is suitable for receiving drugs or other goods which have to be kept dry for a long time. If a further desiccant capacity should be needed, EP 0 454 967 A2 further suggests to use a further desiccant element e.g. a desiccant tablet in the plug of the container.

A desiccant insert gets saturated over time when moisture is ingressing into the vial. As a result of this, desiccant is absorbed close to the external surfaces of the insert so that the external surfaces of the insert become saturated first. This results in an adsorption kinetic that decreases over time because, once the external surfaces or layers close to the surface have been loaded with moisture, additional moisture has to travel a long distance to diffuse to suitable adsorption sites. In other words, it takes a long time to bring humidity down to a layer further remote from the surface of the insert so that, even in case a desiccant insert still has sufficient capacity to adsorb humidity, moisture sensitive goods in the container might take damage before the moisture has been removed from the storage compartment of the container into the insert.

DISCLOSURE OF THE INVENTION

It is the object of the invention to design a container which has improved characteristics when keeping dry goods packaged in the container under all types of exposure to moisture. This object is solved by a container with the features of claim 1. A method for manufacturing such a container is characterized by the features of claim 11. Preferred embodiments follow from the other claims.

The inventive container for receiving moisture sensitive goods comprises a plastic container body and a plastic cap; the cap and the container body being shaped to establish, in the closed state, a leak-proof seal between the container body and the cap. The container body has a base and a sidewall extending upwards from the base. An insert element with a bottom and an insert sidewall is dimensioned to fit into the interior of the container body such that the outer circumferential surface of the insert sidewall is in abutting contact to the inner circumferential surface of the sidewall of the container body. The bottom of the insert element is permeable to moisture and the insert sidewall and the sidewall of the container body are designed to attach the insert element inside the container body. The container has a desiccant chamber between the bottom of the insert element and the base of the container body for receiving a predetermined amount of desiccant material.

Although reference is made to a sidewall of the container body and an insert sidewall, this wording also covers the possibility to replace the circular cross-section and cylindrical shape of the container sidewall and insert sidewall by a shape with flattened wall sections or a polygonal shape of the sidewall subdividing the sidewall into individual sidewall sections which could be angularly oriented relative to each other. Such geometry with flattened sidewalls or with a polygonal shape could even be advantageous to facilitate the user's grip.

Since the outer circumferential surface of the insert sidewall is in abutting contact to the inner circumferential surface of the sidewall of the container body, a double-layered structure of the insert sidewall and the sidewall of the container body is generated. This increases the overall wall thickness. According to a preferred embodiment, the insert sidewall is over a considerable part of its overall outer circumference in abutting contact to the inner circumferential surface of the sidewall of the container body, which means that more than 30% and preferably more than 40% of the outer circumferential surface of the insert sidewall abuts the inner circumferential surface of the sidewall of the container body. According to another preferred embodiment, the insert sidewall only abuts the sidewall in an upper section and a lower section. In this case, the vapor entering through the sidewall can not travel directly to the desiccant chamber but has to penetrate the insert wall first which acts as a further barrier to the ingress of moisture. In other words, a tight sealing is established between the insert sidewall and the container body so that moisture cannot permeate through the sidewalls of the container body and directly into the storage compartment of the container.

The desiccant material can be a particulate desiccant but also any other type of desiccant like e.g. a desiccant tablet, an injection molded desiccant or a self hardening desiccant wax.

The inventive container is specifically adapted to all types of exposure to moisture in a plastic container. These are the ingress of moisture when packaging the goods, during shelf-life and during end use. During the packaging of goods, moisture can be trapped in the headspace of the container before closing the cap onto the container body. The same happens during end use when moisture can enter the container during the repeated opening of the cap when removing the products stored within the container. During shelf-life, moisture diffuses through the container wall into the inner space of the container. According to the inventive container, the bottom of the insert element is permeable to moisture so that any moisture ingressing into the vial and reaching the inner space of the vial can directly be transported into the desiccant chamber between the bottom of the insert element and the base of the container body. Therefore, the inventive container has improved adsorption kinetic in comparison to a desiccant insert as known in the prior art. Further, the dual wall structure of the insert sidewall and the sidewall of the container body result in a slower moisture vapour transmission rate (MVTR) which is inversely proportional to the thickness of the combined overall wall. In this way, the goods stored within the container are better and longer protected, especially in view of the fact that the effect of moisture ingress through the sidewalls of the container during shelf-life has been underestimated so far. A further advantage is that the material of the insert can be selected in such a way that the barrier properties of the insert element are increased. The insert material can be selected according to specific needs. For example it is possible to select the insert material from an oxygen barrier material such as polyamides or ethylene/vinyl alcohol-copolymer (EVOH) to offer passive protection to both moisture and oxygen. Other examples of suitable and preferred materials include polypropylene, high density polyethylene (HDPE) or low density polyethylene (LDPE) all acting as a barrier to moisture.

According to a preferred embodiment of the invention, the insert element can also be made of a desiccant polymer. The term "desiccant polymer" covers any materials which are loaded with a desiccant. Suitable materials as well as a process and an apparatus for compounding and injection-moulding desiccant-filled polymers are described in EP 1 970 188 A1, the contents of which are incorporated herein by reference.

The provision of an insert element made of a desiccant polymer has the advantage that when combined with the desiccant chamber at the bottom of the vial, the provision of an insert element made of a desiccant polymer offers increased desiccant capacity (and therefore increased time of protection for the goods stored inside the container) during shelf-life, and the permeation of vapour through the sidewall can be further reduced because it is trapped in the insert element before reaching the inside of the container.

According to a preferred embodiment of the invention, the bottom of the insert element is provided with multiple openings. Such openings forming a grid element allow the easy transport of vapour to the desiccant chamber. The openings should be selected such that they effectively withhold the desiccant material even in case of small particles inside the desiccant chamber.

According to an alternative preferred embodiment of the invention or in addition to the provision of openings, the bottom of the insert element is provided with a membrane or permeable film. Such embodiment also allows an easy transport of vapour from the storage compartment of the container to the desiccant chamber. However, the provision of a membrane or permeable film has the advantage that the goods stored within the storage compartment of the container cannot come in contact with small desiccant particles which could be generated e.g. by abrasion effects. Consequently a dusting of desiccant material into the storage compartment can be successfully prevented.

According to a preferred embodiment of the invention, the moisture vapour transmission rate (MVTR) of the bottom of the insert element is at least 1.5 times, preferably at least 2 times and most preferably >3 times the moisture vapour transmission rate of the sidewall of the insert element. The MVTR-value as used herein is experimentally determined according to the well-established test procedure. This difference in the MVTR between the bottom of the insert element and the sidewall of the insert element contributes to the desired effect that, especially during shelf-life of the container, any moisture permeating into the storage compartment of the container will be quickly removed therefrom and adsorbed in the desiccant chamber.

Preferably, there is a locking geometry between the insert sidewall and the sidewall of the container body which serves to securely fix the insert element inside the container. Depending on the specific product to be packaged in the inventive container, it might also be possible to attach specifically adapted insert elements from a kit of different insert elements depending on the desired size of the desiccant chamber or the desired permeability of the bottom of the insert element to moisture. In other words, a single container body could be combined with insert elements having a different geometry to optimize the overall container.

Preferably, the locking geometry consists of an annular recess in the inner circumferential surface of the sidewall of the container body receiving the insert sidewall. Such geometry can be used to snap in the insert element when it is mounted inside the container body. The insert sidewall can have an annular ridge which is shaped to snap into the annular recess of the inner circumferential surface of the sidewall of the container body. Generally speaking, the locking geometry can be provided in such a way as to form a suitable form lock connection between the sidewall of the container body and the insert sidewall.

Preferably, a hinge is provided between the body portion and the cap. The hinge between the body portion and the cap of the container can either be a mechanical hinge consisting of a pivot element forming part of the container body to which the cap is rotatably attached, or can be a so-called living hinge according to which the cap is integrally formed with the body portion, and wherein the hinge is formed by a bendable section with a small cross-sectional area between the body portion and the cap.

When a living hinge is used, the production of the container can be simplified because the container body and the cap are simultaneously produced e.g. in an insert moulding process and no separate production and handling of the cap becomes necessary.

According to a preferred embodiment of the invention, the seal between the container body and the cap comprises a sealing skirt depending from the top of the cap, which, in the closed state of the cap, sealingly engages with the wall defining the opening of the container body.

The method for manufacturing a container according to the invention comprises the steps of introducing desiccant material into the container body, inserting the insert element into the container body, fixing the insert element in a defined position relative to the container body and closing the cap on the container body.

BRIEF DESCRIPTION OF THE DRAWINGS

In the following, embodiments of the invention will be described with reference to the accompanying drawings in which FIG. 1 schematically summarizes the key aspects of the invention.

DESCRIPTION OF PREFERRED EMBODIMENTS

Figure 1:
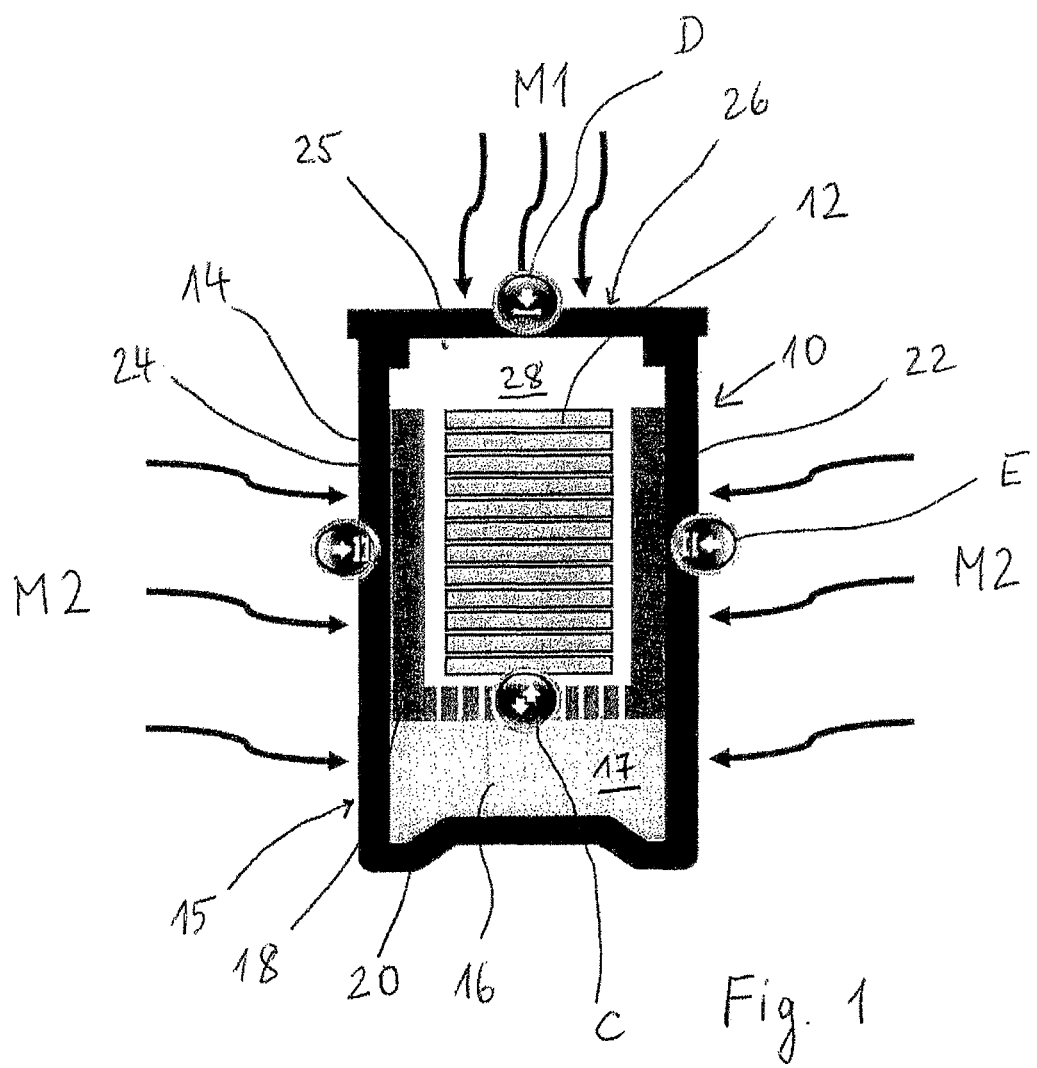

In the figures as discussed herein, the same elements will be denoted with the same reference numerals. References to bottom or top or side refer to a container standing upright on a horizontal surface with the cap on top. However, it should be understood that during shipment, storage and use, the container can take all possible orientations.

The container, generally referenced by reference numeral 10, houses moisture sensitive goods which are exemplified by a stack of tablets 12. These goods are stored in a storage compartment 28. The container 10 comprises a container body 15 and an insert element 14 arranged inside the container body. Further, there is a desiccant chamber 16 formed between the bottom 18 of the insert element and the base 20 of the container body 15. Preferably, the desiccant chamber 16 is filled with desiccant particles 17.

The container body 15 has a sidewall 22 which extends upwardly from the base 20. At the upper end of the sidewall 22, there is an opening 25 which is closed by a cap 26 hingedly attached to the container body 15.

The insert element 14 has a sidewall 24 and a bottom 18. The bottom 18 is provided with openings or regions with increased permeability to moisture. The sidewall 24 of the insert element extending upwardly from the bottom 18 of the insert element 14 is shaped so as to snugly fit into the container body. The outer circumferential surface of the sidewall 24 of the insert element abuts against the inner circumferential surface of the sidewall 22 of the container body 15.

As is indicated in FIG. 1, moisture can enter the container 10 via path M1 through the cap 26 or, in use, when opening the cap. Further, vapour loaded air can penetrate the sidewall of the container via path M2. Further, there is an exchange of vapour from the storage compartment 28 of container 10 to the desiccant chamber 16. This exchange through the bottom 18 of insert is supported by the high permeability of the bottom 18 as is symbolized by symbol C in FIG. 1. The cap 26 is provided as a single-walled structure which already provides a relatively high resistance to the permeation of water vapour. This is symbolized by symbol D in FIG. 1. Due to the double wall structure along most of the sidewall of the storage compartment 28, the permeability of the sidewalls is even smaller than that through the cap 26 as symbolized by symbol E in FIG. 1. In this way, the ingress of moisture is generally reduced and, if it should arrive in the storage compartment 28, the high permeability of the bottom 18 of the insert to the desiccant chamber 16 filled with particulate desiccant material 17 makes sure that the moisture contents in the air within the storage compartment is quickly reduced again to the desired low humidity conditions.

Figure 2:
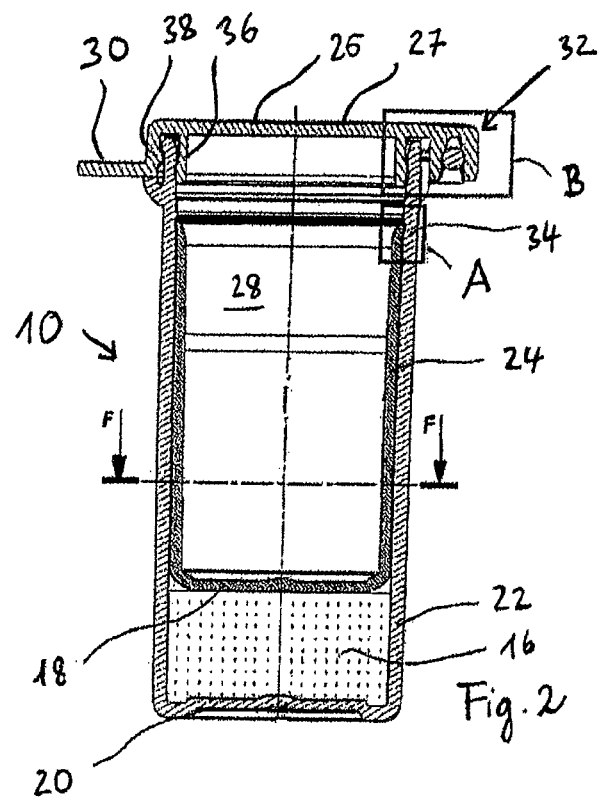
FIG. 2 gives a cross-sectional shape of a container according to the invention.

FIG. 2 schematically shows a cross-sectional view of the container 10 as was schematically given in FIG. 1. As can be seen in FIG. 2, cap 26 is provided with an opening tab 30 which can be either gripped or pressed by the thumb of a user to more easily open the cap of the container. In the embodiment as shown in FIG. 2, the cap 26 is attached to the container body via a hinge 32 which is formed as a mechanical hinge and is shown in more detail in FIG. 6. When the cap 26 is in the closed state as shown in FIG. 2, an annular sealing skirt depending from the base 27 of cap 26 sealingly engages the upper end of the sidewall 22 of the container body. In addition to this, an outer surrounding rim of the cap 26 can be provided which, as schematically shown in FIG. 2, can form a form-lock closure 38 with the upper rim of the sidewall 22 of the container body 15.

Figure 3:
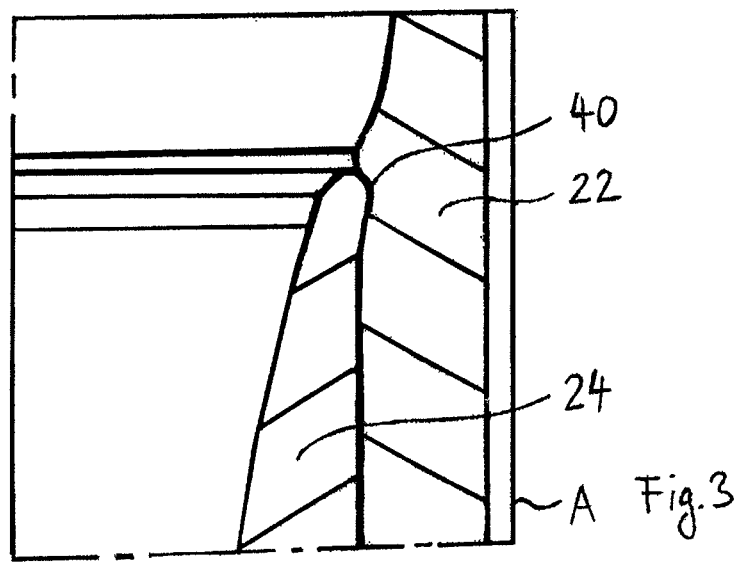
FIG. 3 shows an enlarged view of detail A as given in FIG. 2.

The insert element 14 is secured to the container body 15 in a suitable way. In the specific embodiment as shown in FIG. 2, there is a locking geometry 34 formed between insert element 14 and container body 15. An enlarged view of the locking geometry 34 can be taken from FIG. 3. As can be seen in FIG. 3, there is an annular recess 40 formed in the sidewall 22 of container body 15. The sidewall 24 of insert element 14 has a corresponding geometry which projects into the recess 40 so that a snap-in connection can be formed between insert element 14 and container body 15.

An alternative fixation of the insert element inside the container body could be an annular protrusion around the inside of the sidewall 22 of container body 15 onto which the bottom 18 of the insert is placed. However, the fixation as shown in FIGS. 2 and 3 has the advantage that, depending on the product to be packaged or depending on the climatic environment, differently shaped insert elements could be secured to the container body. Such differently shaped insert elements could provide for a larger or smaller desiccant chamber 16 so that, depending on the specific needs, a different amount of desiccant material could be placed in the container 10.

An alternative for increasing the desiccant capacity is the choice of material of the insert element. The insert element could be made of desiccant polymer which further increases the overall capacity of the desiccant material inside the container. However, the different kinetics of adsorption into a desiccant chamber and into an insert element made of desiccant polymer should be considered.

In this embodiment, the external surface area of the insert, i.e. the overall surface area of the double-walled structure formed by the insert element inside the container body should be at least 30% of the whole surface area of the container, preferably more than 40%.

Figure 4:
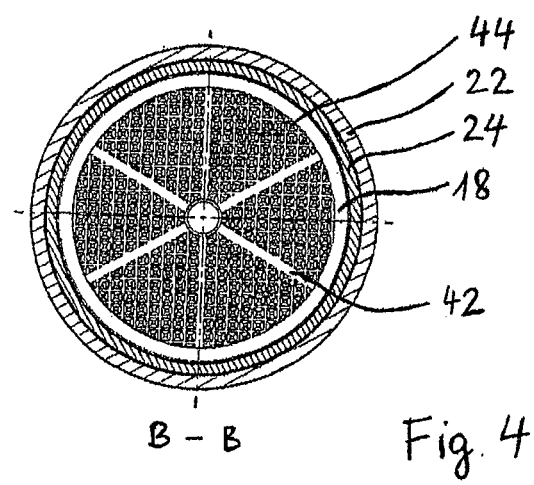
FIG. 4 is a view in the direction F-F as shown in FIG. 2.

FIG. 4 shows the view in direction F-F in FIG. 2. It shows the annular sidewall 22 of the container body and the sidewall 24 of the insert element which are in contact with each other leading to a double-walled overall structure of the container 10 in this region. Further, the bottom 18 of insert is shown which is provided with a plurality of holes 44 covered with a membrane or film. In order to stabilize the bottom 18 of the insert element 14, radially arranged supporting ribs 42 are provided. However, the provision of such supporting ribs 42 and their specific number and arrangement are given by way of example only and any configuration or even the omission of a specific supporting structure is possible as long as the bottom 18 of the insert element 14 has a sufficient stability for carrying the goods to be packaged inside the container 10.

The holes covered with a membrane or film could also be provided without a membrane or film element. These holes 44 ease the gas exchange. In contrast thereto, the sidewall 24 of the insert element could be made of a humidity barrier polymer. This leads to a moisture vapour transmission rate (MVTR) of the bottom 18 of insert which is at least 1.5 times, preferably 2 times or even 3 times as high as the sidewall 24 of the insert element 14.

Figures 5, 6:
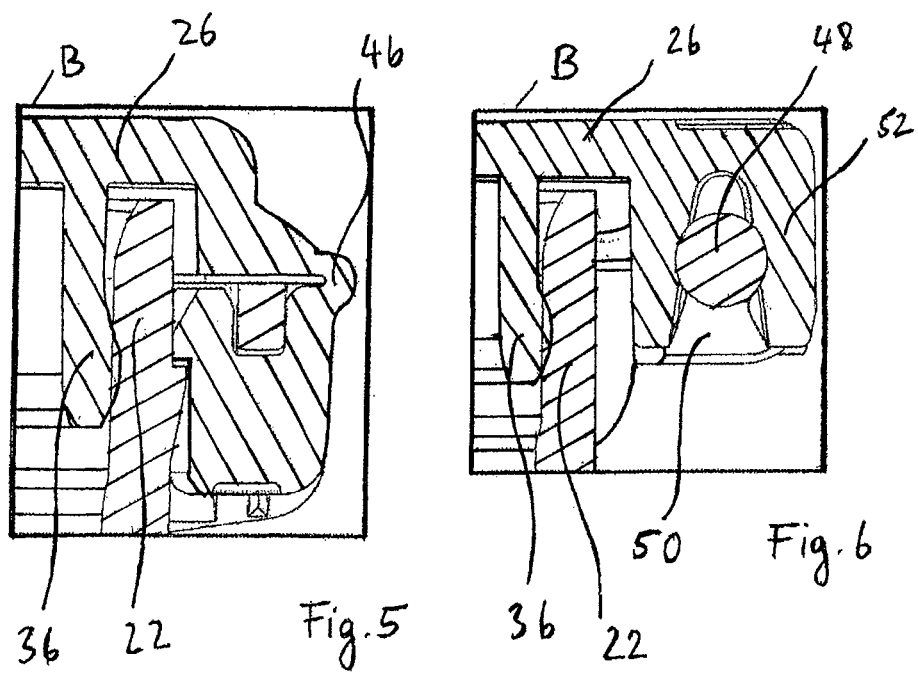
FIGS. 5 and 6 are two alternatives of the hinge structure indicated with the box B in FIG. 2.

FIGS. 5 and 6 show two alternatives how the hinge of the container could be provided. Further, the specific sealing geometry between the sealing skirt 36 and the upper end region of sidewall 22 of the container body 15 is shown. In the example as shown in FIG. 5, a so-called living hinge is provided in which the hinge 46 consists of a section of plastic material which has a relatively thin cross-section and can be easily bent. Such living hinges between a container body and a cap are known in the art of desiccant containers. Likewise, the provision of a mechanical hinge is also known. In the example as shown in FIG. 6, a pivot element 48 is carried by a supporting structure 50 of the container body. The cap is provided with a fulcrum 52 which allows a snap fit connection between the fulcrum 52 of the cap and the pivot element 48 of the container body. Once connected, the cap can be pivoted around the pivot element 48.

Figure 7:
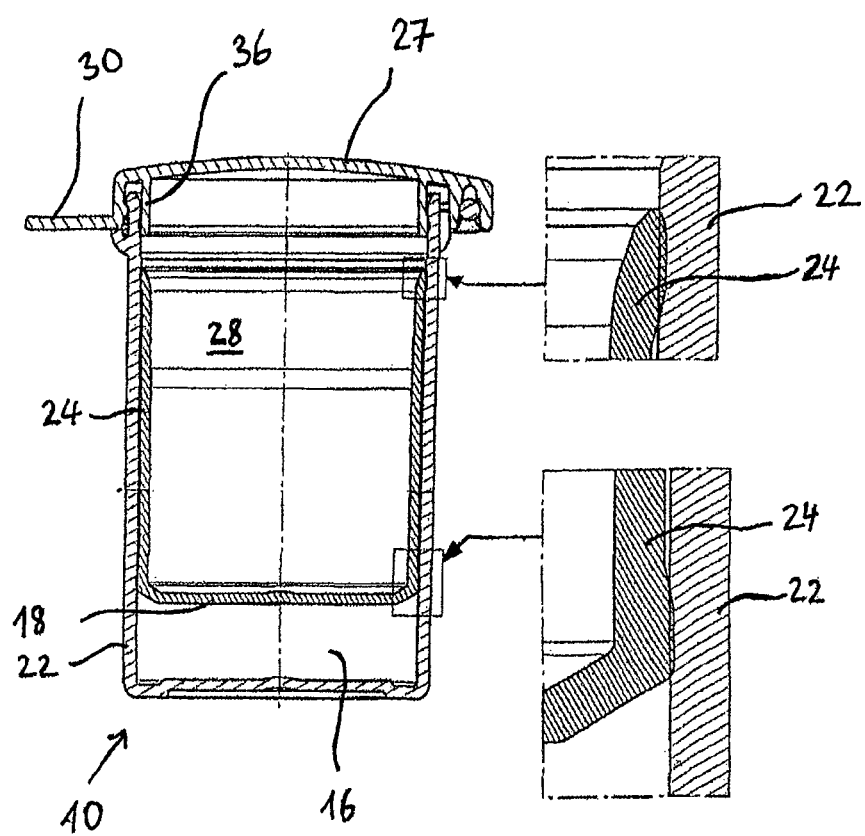
FIG. 7 shows a cross-sectional view of the inventive container according to a further embodiment including enlarged details.

FIG. 7 shows another embodiment of the inventive container which differs from that as shown in the previous embodiment in two respects. Firstly, the side wall 24 of the insert element is fixed to the annular side wall of the container body in two distinct regions. As demonstrated with the upper and lower boxes also given in enlarged detail views in FIG. 7, side wall of the insert element is fixed to side wall 22 of the container body at an upper region and a lower region of the insert element. In both regions as shown in the enlarged detail views in FIG. 7, the side wall 24 of the insert element is shaped and dimensioned so as to establish a press-fit connection to the side wall of the container body. Such annular press-fit is advantageous in that, despite of certain manufacturing tolerances, an airtight annular seal between the insert element and the container body is established. However, it is also possible to combine a press-fit connection as shown in FIG. 7 to a form fit connection as shown in the above FIG. 2. Such combination could be useful when the press fit generates high friction forces to be overcome when introducing the insert element and/or when it is desired to indicate the proper positioning of the insert element by providing an audible feedback when the snap-fit-connection has been properly established.

Figure 8:
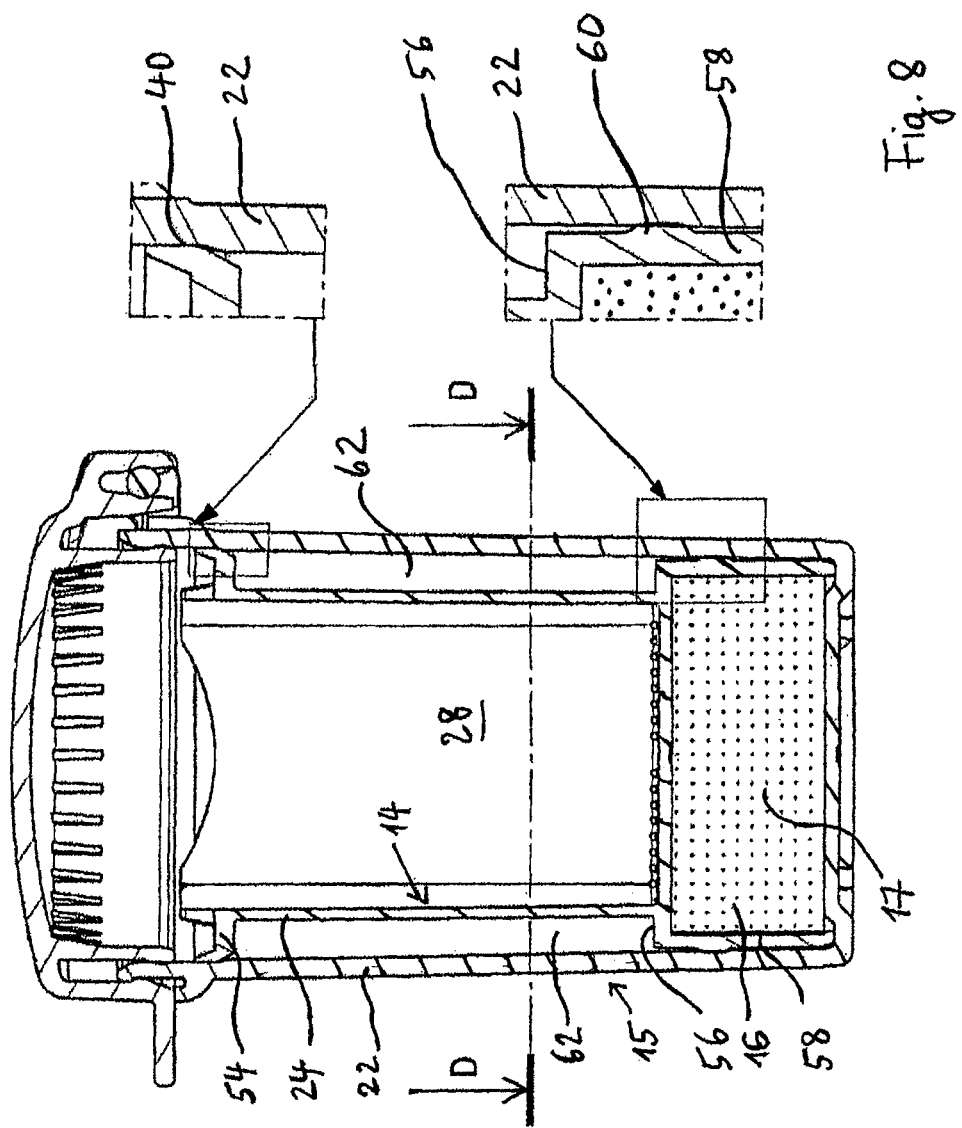
FIG. 8 shows a cross-sectional view of another embodiment of the inventive container including enlarged details.

FIG. 8 shows another embodiment of the invention which, as regards the shape of the container body, is very similar to that as shown in FIG. 7. The major difference between the previous embodiments and that as shown in FIG. 8 is the geometry of the insert element which has a rectangular cross-section with slightly rounded side walls. This can be best seen from FIG. 9 which is a view in the direction of arrows D-D in FIG. 8. The insert element according to FIG. 8 has an inner shape which could be used for storing certain products e.g. test strips or the like which can be kept in a desired order by providing a rectangular inner geometry of the insert element.

In the embodiment according to FIG. 8, there is also established a tight connection between the side wall 24 of the insert element and the annular side wall 22 of the container body. To this end, the side wall 24 of the insert element is provided with an upper flange 54 which has a round circumference which is seated in an annular recess 40 formed in the side wall 22 of the container body 15. This geometry can also be used to provide a snap-in connection which can be formed between the insert element 14 and the container body 15.

Figure 9:
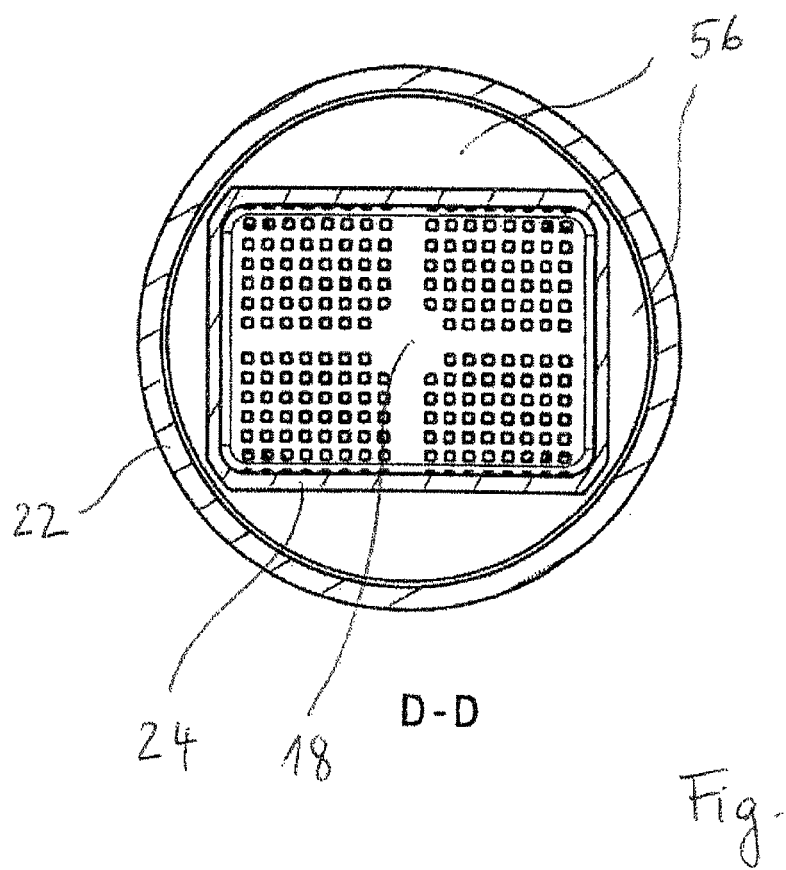
FIG. 9 is a view in the direction D-D as shown in FIG. 8.

In the lower section of the insert 14, there is provided a second flange 56 which has a circular circumference and can be best seen in FIG. 9 which demonstrates the four sections of the second flange 56 and its circular circumference corresponding to the inner circumference of the side wall 22 of the container body. The second flange 56 continues in a downward direction in a circular side wall 58 of the insert element which closely follows the inner circumference of the annular side wall 22 of the container body. The wall 58 is provided with a circumferential nose 60 which is shaped and dimensioned so as to form a press fit to the inner circumference of the annular side wall 22 of the container body.

The button 18 of the insert according to this embodiment is not the lowest part of the insert but has the same function as described in the above embodiments. It delimits the storage compartment 28 and is provided with a high permeability to allow easy communication of moisture to adjacent desiccant chamber 16 filled with particular desiccant material 17.

Due to the abutting contact between the insert element and the annular side wall 22 of the container body in two distinct positions, namely the upper region and the lower region of the insert element, moisture penetrating the side wall 22 of the container and entering the free volumes 62 between the container body and the insert element, can not enter the desiccant chamber but has to pass through the wall of the insert element as a further barrier. Such further barrier could be either the flange 54 to enter the storage compartment 28 and into the desiccant chamber 16, or the second flange 56, or the side wall 24 of the insert element entering the storage compartment which has easy access to the desiccant chamber. Thus, the embodiment according to FIG. 8 also provides a double barrier.

The material of the container and of the insert element can be selected according to the specific requirements of container 10. It is possible to select the material of the insert such that the barrier properties explained with reference to FIG. 1 are increased. When the insert is provided as a desiccant entrained polymer, moisture penetrating the sidewall 22 of container body 15 becomes trapped inside the sidewall 24 of insert element and does not diffuse into the storage compartment 28. Alternatively, the material of the insert could be selected from an oxygen barrier material such as polyamide or EVOH which leads to a passive protection against moisture and oxygen. Other suitable materials are PP, HDPE or LDPE, all acting as a barrier to moisture.

In view of the finding that the penetration of moisture into a desiccant container during its shelf-life has not received sufficient attention so far, the present container combines an increased barrier against the permeation of moisture through the sidewalls into the container and an improved kinetics when removing moisture inside the container resulting in a reduction of the exposure to moisture of products inside the container.

Figure 10:
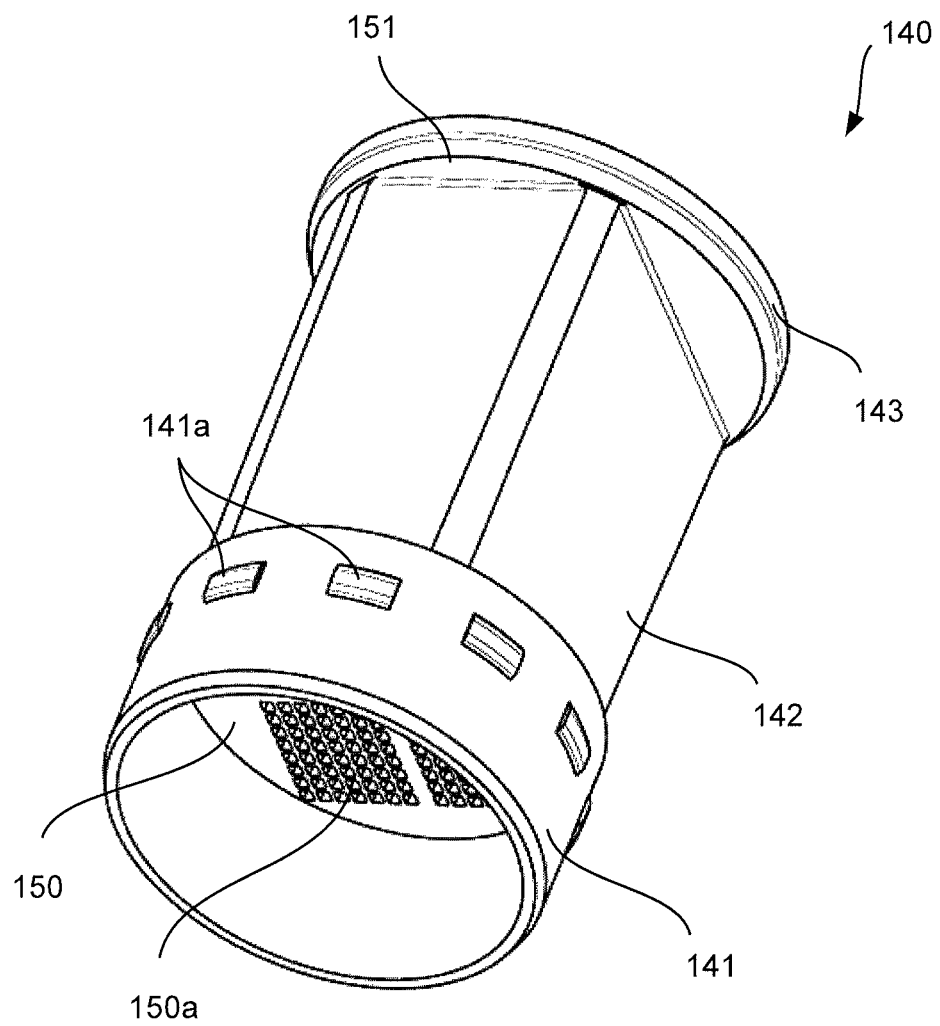
FIG. 10 is a perspective view of an insert element of the fourth embodiment.
Figure 11:
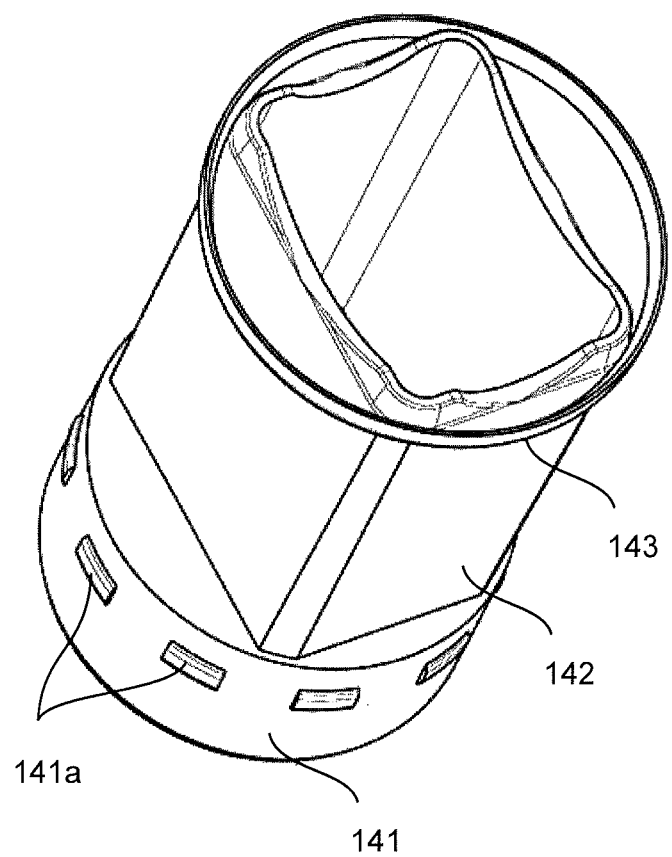
FIG. 11 is another perspective view of the insert element of the fourth embodiment.
Figure 12:
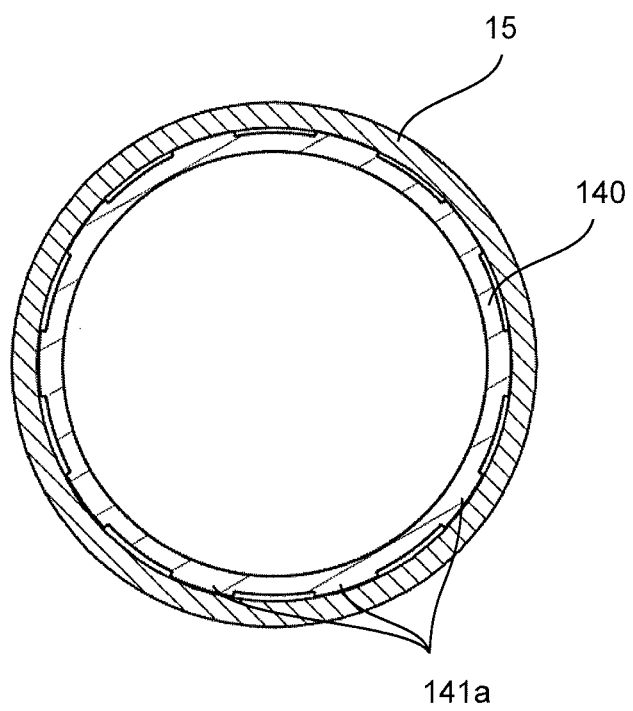
FIG. 12 is a cross-section of a container with the insert of the fourth embodiment inserted into the container which is taken in the area of protruding portions of the insert element.

A fourth embodiment is explained on the basis of FIGS. 10-12. Features of the previous embodiments can be implemented in the fourth embodiment, and vice versa.

The fourth embodiment refers to an insert element 140 which can be introduced into a container body 15 of a container 10.

Moisture sensitive goods like a stack of tablets can be arranged in the insert element 140. The insert element 140 can be made of a desiccant material, like desiccant entrained polymer or the like, in order to trap moisture penetrating the sidewall of a container. Further, various modifications to the specific structure disclosed herein, which accomplish the same desired functions, are also included within the disclosure herein.

The insert element 140 comprises a first sidewall portion 141, a second sidewall portion 142 and a third sidewall portion 143. When inserted into a container body 15 of a container 10, the first sidewall portion 141 is proximate to the base of the container, whereas the third sidewall portion is arranged adjacent or close to the opening of the container body.

In one embodiment, the first sidewall portion 141 has a cylindrical shape, whereas the second sidewall portion 142 is formed in a rectangular tube shape. Other shapes of the second sidewall portion may also be used, which are appropriate for storage of moisture sensitive goods and to provide a gap or free volume between the outer surface of the body sidewalls of the insert element and inner surface of the container body. In this embodiment, the third sidewall portion 143 has a cylindrical shape, with a smaller axial extension as compared to the first and second sidewall portions. The second portion of the insert is designed such as to form a gap creating a distance between the insert element and the body sidewalls resulting in the free volume allowing air circulation.

The first sidewall portion 141 of the insert element 140 includes a plurality of protruding portions 141*a* which engage with the inner wall of the container, when the insert element 140 is inserted into the container. The protruding portions 141*a* can have substantially the same dimensions and can be equally spaced in a circumferential direction of the first sidewall portion 141.

An inner wall 150 is provided on a side of the first sidewall portion 141 facing the second sidewall portion 142. The inner wall 150 can be provided with a plurality of openings 150*a*, allowing moisture to pass through the inner wall 150.

The second sidewall portion 142 arranged on the inner wall 150, in one embodiment, has four sidewalls to form, in cross-section, a rectangular shape, preferably a square shape. Moisture sensitive goods can be accommodated inside the second sidewall portion 142. Any shape for the second sidewall portion can be utilized as long as a gap or free volume is formed between the outer surface of the sidewall of the insert element and inner surface of the container body.

The third sidewall portion 143 has a substantially constant outer diameter and a wall 151 facing the second sidewall portion 142. The four sidewalls of the second sidewall portion 142 merge into the wall 151. In an alternative embodiment the structure of the third sidewall portion can be similar to the structure of the first sidewall portion.

A press fit with high friction forces can be generated between the insert element 140 and the inner wall of the container when introducing the insert element 140 into the container body 15. In particular, a press fit connection is provided between the protruding portions 141*a* and the inner wall of the container and between the third sidewall portion 143 and the container body 15. In other words, the insert sidewall only abuts the sidewall in an upper section and a lower section.

Since the protruding portions 141*a* are spaced apart from each other, the press-fit connection provides a discontinuous connection between the protruding portions 141*a* and the inner wall of the container. In a further embodiment the third sidewall portion may be provided with a similar structure to that of the first sidewall portion, thereby resulting in a discontinuous press-fit connection between the third sidewall portion and the inner wall of the container.

A free volume is formed between the container body 15 and the sidewall of the insert element 140, which is located between the press-fit connections at the upper and lower sections of the sidewall.

The discontinuous press-fit has the advantage that moisture entering into the container and the inner space (for example moisture from the air external to the container, that enters by diffusion through the sidewalls or by opening and closing the container) can more easily circulate in the free volume between the container body and the second sidewall portion 141 of the insert element 140. By allowing a communication between the inner space and the free volume (through the permeable bottom of the insert element 140 and the discontinuous press-fit at the first sidewall portion 141), moisture can more easily and quickly be trapped by the desiccant entrained within the insert or the additional desiccant that may be present in a chamber between the bottom of the first sidewall portion (141) of the insert element (140) and the base of the container body.

The third sidewall portion 143 having a constant outer diameter provides a continuous press-fit connection so that an airtight annular seal is established between the insert element 140 and the container body.

According to a further embodiment, the third sidewall portion 143 can have protruding portions similar to the protruding portions 141*a* of the fourth embodiment, thereby providing a discontinuous press-fit connection between the corresponding protruding portions and the inner wall of the container.

The container can further include a chamber between the bottom of the first sidewall portion 141 of the insert element 140 and the base of the container body, such chamber being able to receive a predetermined amount of desiccant material (such a chamber is shown in FIG. 8, for example). The provision of such a desiccant chamber has the advantage that when combined with the desiccant polymer of the insert element 140, the provision of the desiccant chamber offers increased desiccant capacity. The chamber can also contain any other agent able to act on the atmosphere contained in the container (such as an oxygen scavenger for example).

Alternatively, the insert element can be configured so that a relatively small or no desiccant chamber is provided between the lower portion of the insert element and the bottom of the container body. With such a configuration, an insert element with increased capacity to house goods like tablet is provided.

FIG. 12 shows a cross-section of a container with the insert of the fourth embodiment inserted. The container could for example be the container of one of the embodiments shown in FIG. 7 or 8, and the cross-section could be taken from one of the areas of the enlarged details in FIGS. 7 and 8.

Figure 13:
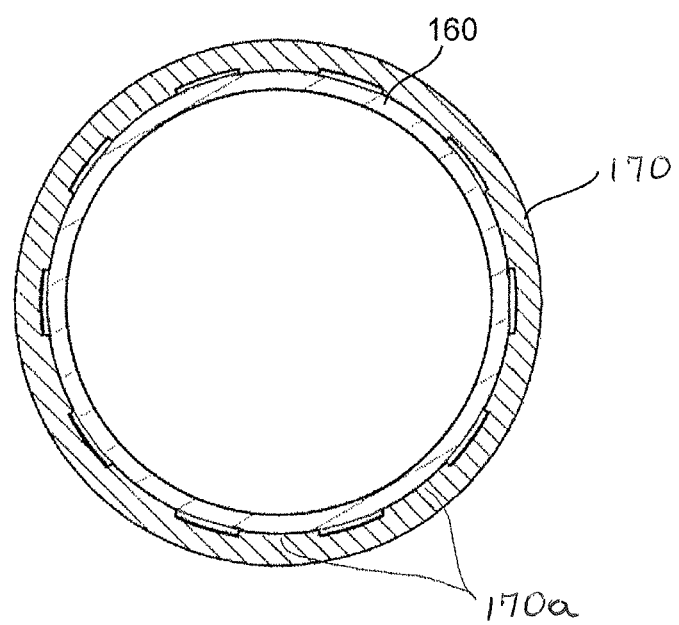
FIG. 13 is a cross-sectional view of a container of a fifth embodiment with an insert inserted into the container which cross-section is taken in the area of protruding portions of the container.

FIG. 13 is a cross-sectional view of a container body 170 of a fifth embodiment, wherein an insert 160 is inserted into the container body 170. The insert 160 can have a shape similar to one of the previous embodiments. Alternatively, the insert can have an outer wall having a substantially cylindrical shape.

The container body 170 of FIG. 13 comprises a plurality of rib portions 170*a*. The rib portions 170*a* extend inward from the inner circumferential wall of the container body 150a to the inner side of the container body. The insert 160 inserted into the container body 170 engages with the rib portions 170a of the container body 170, thereby providing a discontinuous press-fit connection between the rib portions 170a and the corresponding portions of circumferential wall of the insert 160.

For example, the rib portions of the container body are arranged so that a lower section of the sidewall of the insert element engages the rib portions. Further, the upper section of the insert element can be configured similar to one of the embodiments of FIGS. 7, 8.

Figure 14:
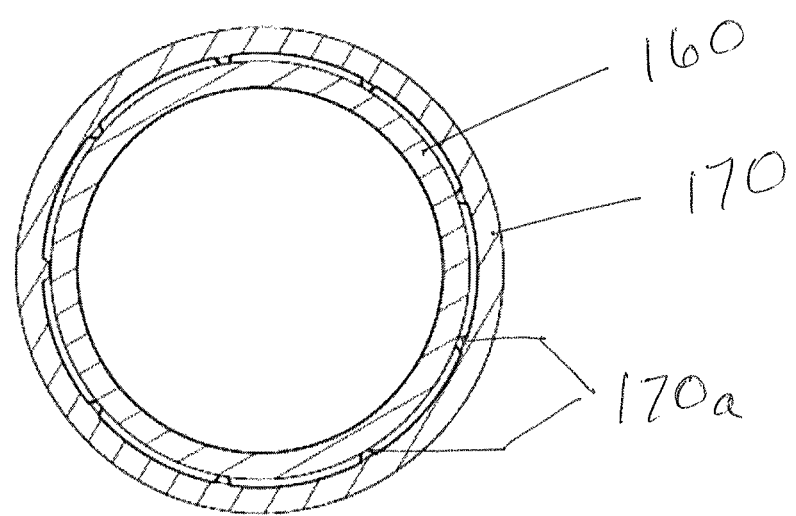
FIG. 14 is an alternative embodiment of the container shown in FIG. 13.

An alternate embodiment of the container body 170 with insert 160 of FIG. 13 is shown in FIG. 14 wherein the dimension of the rib portions 170a have been reduced in a circumferential direction. The embodiment shown in FIG. 14 demonstrates that different dimensions of the rib portions 170a may be used.

The invention claimed is:

1. A container for receiving moisture sensitive goods comprising:
    a container body and a cap; wherein the cap and the container body establish, in a closed state, a leak-proof seal between the container body and the cap;
    wherein the container body comprises a base and a sidewall extending upwards from the base;
    an insert element with an insert sidewall, wherein the insert element fits into an interior of the container body;
    wherein the container body further comprises a portion extending inward from an inner circumferential wall of the container body, and wherein a lower section of the sidewall of the insert element engages the inward extending portion of the container body, thereby establishing a press-fit connection between the inward extending portion of the container body and the lower section of the insert element,
wherein in an upper portion of the sidewall of the insert element, the insert element has a portion with an outer diameter which is larger than the facing inner diameter of a sidewall of the container body, when measured prior to installation of the insert element, thereby establishing a press-fit connection between portions of the sidewall of the container body and portions of an upper section of the sidewall of the insert element, and
wherein a free volume is formed between the container body and the sidewall of the insert element, which is located between the press-fit connections at the upper and lower sections of the sidewall.

2. The container according to claim 1, wherein the insert element is made of a desiccant polymer.

3. The container according to claim 1, wherein the bottom of the insert element includes multiple openings.

4. The container according to claim 1, wherein the bottom of the insert element includes a membrane or a permeable film.

5. The container according to claim 3, wherein a moisture vapour transmission rate (MVTR) of the bottom of the insert element is at least 1.5 times, as high as a moisture vapour transmission rate of the sidewall of the insert element.

6. The container according to claim 1, wherein the insert sidewall and the sidewall of the container body include a locking geometry which attaches the insert element inside the container body in a predetermined position.

7. The container according to claim 6, wherein the locking geometry comprises an annular recess in an inner circumferential surface of the sidewall of the container body receiving the insert sidewall.

8. The container according to claim 1 wherein the cap is connected via a hinge to the container body; and wherein
    the hinge is a mechanical hinge comprising a pivot element of the container body to which the cap is rotatably attached.

9. The container according to claim 1, wherein the cap is integrally formed with the container body, and a hinge is formed by a bendable section with a relatively thin cross-sectional area between the container body and the cap.

10. The container according to claim 1, wherein the seal between the container body and the cap comprises a sealing skirt extending from a top of the cap, which, in the closed state of the cap, sealingly engages with an opening of the container body.

11. The container according to claim 1, wherein the insert element comprises a first sidewall portion, a second sidewall portion and a third sidewall portion, wherein, when inserted into a container, the first sidewall portion is proximate to the base of the container.

12. The container according to claim 11, wherein the first sidewall portion has a cylindrical shape, the second sidewall portion is formed in a rectangular tube shape and the third sidewall portion has a cylindrical shape.

13. The container according to claim 11, wherein a plurality of protruding portions spaced apart from each other in a circumferential direction is provided on the first sidewall portion.

14. The container according to claim 11, wherein the third sidewall portion has a circumferential portion with substantially continuous outer diameter.

* * * * *